US012693415B2

(12) United States Patent
　　Iguchi

(10) Patent No.: US 12,693,415 B2
(45) Date of Patent: Jul. 28, 2026

(54) LIGHT EMITTING ELEMENT ARRAY AND DETECTION APPARATUS

(71) Applicant: FUJIFILM Business Innovation Corp., Tokyo (JP)

(72) Inventor: Daisuke Iguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 926 days.

(21) Appl. No.: 17/985,084

(22) Filed: Nov. 10, 2022

(65) Prior Publication Data

US 2023/0305149 A1 Sep. 28, 2023

(30) Foreign Application Priority Data

Mar. 23, 2022 (JP) ................................. 2022-047441

(51) Int. Cl.
　*G01S 17/10* (2020.01)
　*G01S 7/481* (2006.01)
　*G01S 7/4865* (2020.01)

(52) U.S. Cl.
　CPC ............ *G01S 17/10* (2013.01); *G01S 7/4815* (2013.01); *G01S 7/4865* (2013.01)

(58) Field of Classification Search
　CPC ...... G01S 17/10; G01S 7/4815; G01S 7/4865; G01S 7/484; G01S 7/4863; G01S 7/4876
　See application file for complete search history.

(56) References Cited

U.S. PATENT DOCUMENTS

| | | | | |
|---|---|---|---|---|
| 8,566,498 | B2 * | 10/2013 | Lemarchand | H04L 67/306 |
| | | | | 710/303 |
| 8,605,158 | B2 * | 12/2013 | Yoshizumi | H04N 23/62 |
| | | | | 348/207.1 |
| 9,491,416 | B2 * | 11/2016 | Kamei | H04N 7/185 |
| 9,595,838 | B2 * | 3/2017 | Tanabe | H02J 50/80 |
| 9,780,590 | B2 * | 10/2017 | Nguyen | H02J 7/0068 |
| 10,038,843 | B2 * | 7/2018 | Kitagawa | H04N 23/667 |
| 11,092,678 | B2 | 8/2021 | Barnes et al. | |
| 2006/0279253 | A1 * | 12/2006 | Kawai | H04N 23/661 |
| | | | | 348/E5.043 |
| 2018/0222499 | A1 * | 8/2018 | Gomes | G06V 20/52 |
| 2018/0237041 | A1 * | 8/2018 | Mesher | G06T 7/001 |
| 2020/0158656 | A1 * | 5/2020 | Chung | G06T 7/0004 |
| 2020/0186778 | A1 * | 6/2020 | Meyer | H04N 13/189 |
| 2020/0209355 | A1 * | 7/2020 | Pacala | G01S 7/484 |
| 2020/0349743 | A1 * | 11/2020 | Kitamura | H04N 7/181 |
| 2021/0146974 | A1 * | 5/2021 | Wang | H04B 7/06952 |
| 2021/0392265 | A1 * | 12/2021 | Kim | H04N 23/631 |
| 2022/0163640 | A1 * | 5/2022 | Mao | G01S 7/481 |
| 2022/0408026 | A1 * | 12/2022 | Kim | H04N 23/695 |

FOREIGN PATENT DOCUMENTS

| | | |
|---|---|---|
| JP | 2019219400 | 12/2019 |
| WO | 2020243130 | 12/2020 |

OTHER PUBLICATIONS

"Notice of Reasons for Refusal of Japan Counterpart Application", issued on Jan. 6, 2026, with English translation thereof, p. 1-p. 5.

* cited by examiner

*Primary Examiner* — Frank F Huang
(74) *Attorney, Agent, or Firm* — JCIPRNET

(57) ABSTRACT

A light emitting element array includes: plural light emitting elements that emit light having different wavelengths to a detection target object and are arranged to be adjacent to each other.

16 Claims, 10 Drawing Sheets

LIGHT EMITTING ELEMENT ARRAY AND DETECTION APPARATUS

CROSS-REFERENCE TO RELATED APPLICATIONS

This application is based on and claims priority under 35 USC 119 from Japanese Patent Application No. 2022-047441 filed Mar. 23, 2022.

BACKGROUND

(i) Technical Field

The present disclosure relates to a light emitting element array and a detection apparatus.

(ii) Related Art

JP2019-219400A discloses a method of measuring a depth that is insensitive to damaged light due to in-plane reflection. The method includes causing a light source to radiate light to a scene, performing damaged light measurement by controlling a first charge storage unit of a pixel to collect charges based on light hit on the pixel during a first period in which the damaged light hits the pixel, but light returning from an object within the field of view of the pixel does not hit the pixel, removing a contribution from the damaged light from one or more measurements affected by the damaged light, based on the damaged light measurement, and determining the depth based on the one or more measurements in which the contribution from the damaged light has been removed.

SUMMARY

Aspects of non-limiting embodiments of the present disclosure relate to a light emitting element array and a detection apparatus capable of suppressing interference of light due to multipath as compared to a case where wavelengths of light emitted from a plurality of light emitting elements are the same as each other.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light emitting element array including: a plurality of light emitting elements that emit light having different wavelengths to a detection target object and are arranged to be adjacent to each other.

BRIEF DESCRIPTION OF THE DRAWINGS

Exemplary embodiment(s) of the present invention will be described in detail based on the following figures, wherein.

DETAILED DESCRIPTION

Figure 1:
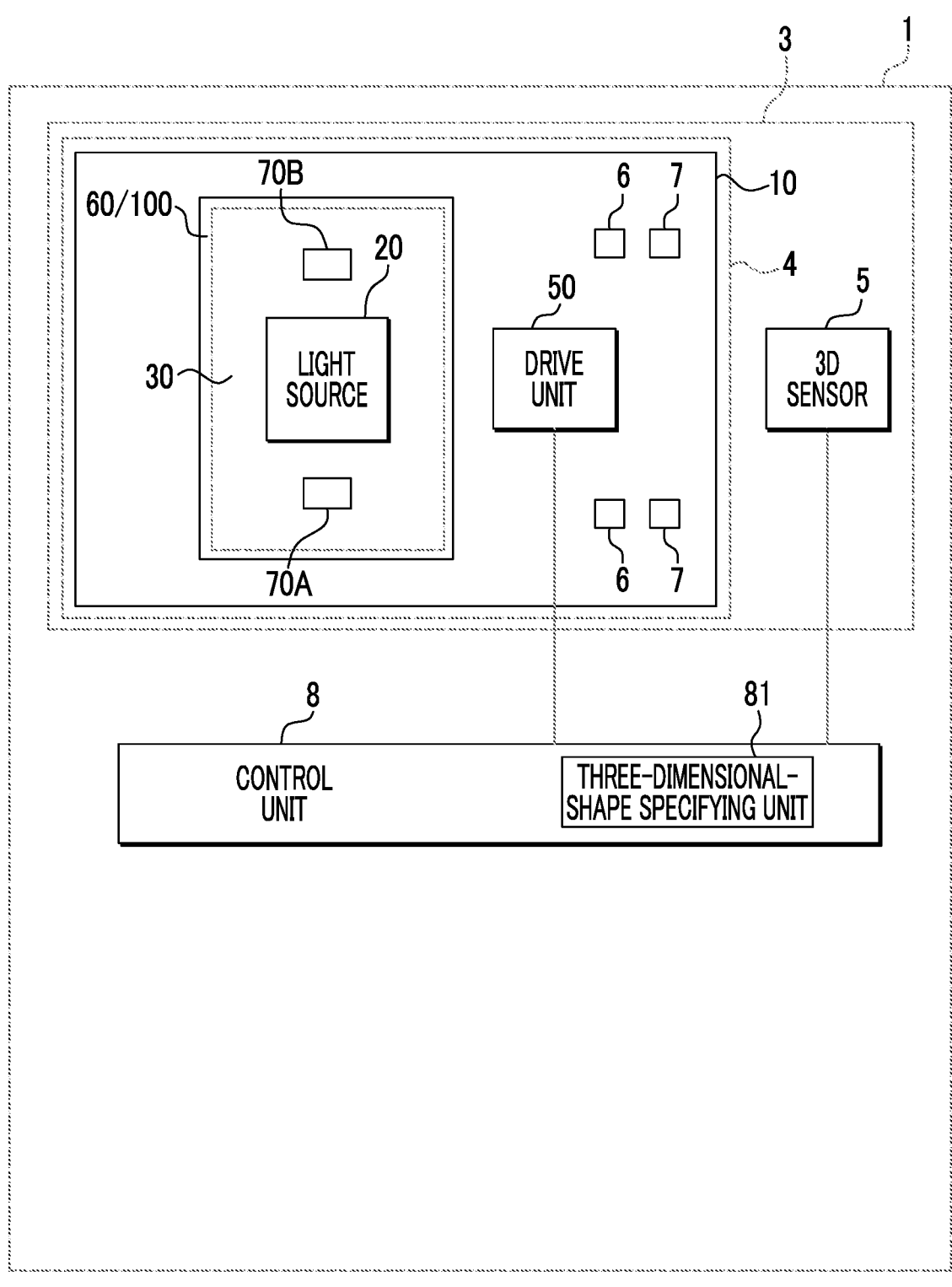
FIG. 1 is a schematic configuration diagram illustrating a configuration of a measurement apparatus.

Hereinafter, an example of an exemplary embodiment according to the technique of the present disclosure will be described in detail with reference to the drawings.

As a measurement apparatus that measures the three-dimensional shape of a measurement target, there is an apparatus that measures the three-dimensional shape based on the so-called time-of-flight (ToF) method which is based on the time of flight of light. In the ToF method, a time from a timing at which light is emitted from a light source in the measurement apparatus to a timing at which light with which irradiation is performed is reflected by the measurement target, and then is received by a three-dimensional sensor (referred to as a 3D sensor below) in the measurement apparatus is measured, and the distance to the measurement target is measured. In this manner, the three-dimensional shape is specified. A target for measuring the 3D shape is referred to as the measurement target. The measurement target is an example of a detection target object. Measurement of a three-dimensional shape may be referred to as "three-dimensional measurement", "3D measurement", or "3D sensing".

The ToF method includes a direct method and a phase difference method (indirect method). The direct method is a method of irradiating a measurement target with pulsed light emitted for a very short time, and actually measuring a time until the light is returned. The phase difference method is a method of periodically flickering pulsed light and detecting, as a phase difference, a time delay when a plurality of rays of pulsed light travel back and forth to and from a measurement target. In the present exemplary embodiment, a three-dimensional shape is measured by the phase difference method as an example.

Such a measurement apparatus is mounted in a portable information processing apparatus or the like, and is used for face authentication of a user who intends to perform an access. In the related art, in the portable information processing apparatus and the like, a method of authenticating a user by using a password, fingerprint, iris, or the like is used. In recent years, there has been a demand for an authentication method with higher security. Therefore, a measurement apparatus that measures a three-dimensional shape has been mounted in the portable information processing apparatus. That is, the measurement apparatus acquires a three-dimensional image of the face of a user who has performed an access, and identifies whether or not the access is permitted. Only in a case where the user is authenticated to have the permitted access, the measurement apparatus permits the use of the own apparatus (portable information processing apparatus).

In addition, such a measurement apparatus is also applied to a case of continuously measuring the three-dimensional shape of a measurement target, such as in augmented reality (AR).

The configurations, functions, methods, and the like described in the present exemplary embodiment described below can be applied not only to face authentication and augmented reality, but also to measurement of the three-dimensional shape of other measurement targets.

Measurement Apparatus 1

FIG. 1 is a block diagram illustrating an example of a configuration of a measurement apparatus 1 that measures a three-dimensional shape.

The measurement apparatus 1 includes an optical device 3 and a control unit 8. The control unit 8 controls the optical device 3. The control unit 8 includes a three-dimensional-shape specifying unit 81 that specifies the three-dimensional shape of a measurement target. The measurement apparatus 1 is an example of a detection apparatus. The control unit 8 is an example of a detection unit.

Figure 2:
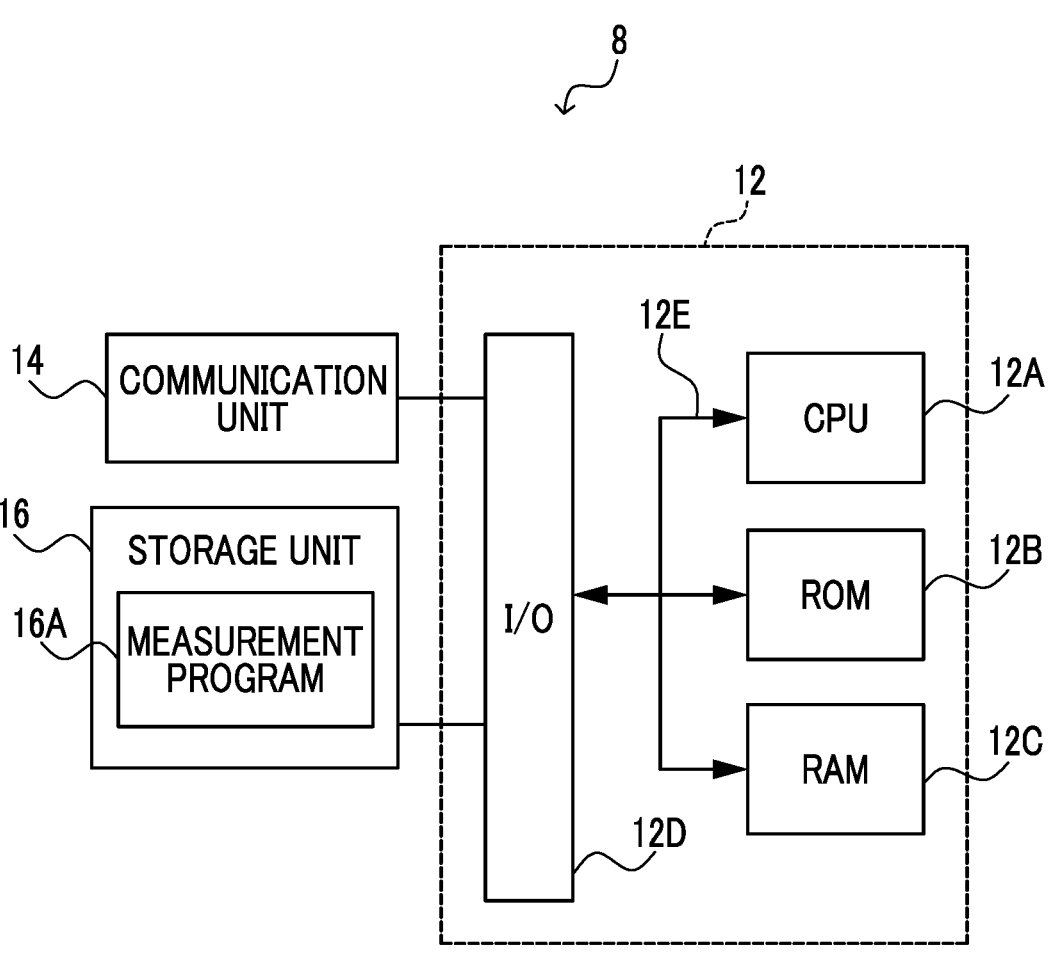
FIG. 2 is a block diagram illustrating a basic configuration of an electrical system in the measurement apparatus.

FIG. 2 is a block diagram illustrating a hardware configuration of the control unit 8. As illustrated in FIG. 2, the control unit 8 includes a controller 12. The controller 12 includes a central processing unit (CPU) 12A, a read only memory (ROM) 12B, a random access memory (RAM) 12C, and an input and output interface (I/O) 12D. The CPU 12A, the ROM 12B, the RAM 12C, and the I/O 12D are connected via a system bus 12E. The system bus 12E includes a control bus, an address bus, and a data bus.

A communication unit 14 and a storage unit 16 are connected to the I/O 12D.

The communication unit 14 is an interface for performing data communication with an external device.

The storage unit 16 is configured by a non-volatile rewritable memory such as a flash ROM or the like, and stores a measurement program 16A and the like, which will be described later. The three-dimensional-shape specifying unit 81 is configured and the three-dimensional shape of a measurement target is specified, in a manner that the CPU 12A reads the measurement program 16A stored in the storage unit 16 into the RAM 12C and executes the measurement program 16A.

The optical device 3 includes a light emitting device 4 and a 3D sensor 5. The light emitting device 4 includes a wiring board 10, a heat dissipation base material 100, a light source 20, a light diffusion member 30, a drive unit 50, a retention unit 60, and capacitors 70A and 70B. Furthermore, the light emitting device 4 may include passive elements such as a resistive element 6 and a capacitor 7 in order to operate the drive unit 50. Here, it is assumed that two resistive elements 6 and two capacitors 7 are provided. Although two capacitors 70A and 70B are illustrated, one capacitor may be provided. The capacitors 70A and 70B are referred to as a capacitor 70 in a case where the capacitors 70A and 70B are not distinguished from each other. One or a plurality of resistive elements 6 and one or a plurality of capacitors 7 may be provided. Here, electrical components such as the 3D sensor 5, the resistive element 6, and the capacitor 7 other than the light source 20, the drive unit 50, and the capacitor 70 may be referred to as circuit components without distinguishing the above electrical components from each other. The capacitor may be referred to as a capacitor. The 3D sensor 5 is an example of a light receiving unit.

The heat dissipation base material 100, the drive unit 50, the resistive element 6, and the capacitor 7 in the light emitting device 4 are provided on the front surface of the wiring board 10. Although the 3D sensor 5 is not provided on the front surface of the wiring board 10 in FIG. 1, the 3D sensor 5 may be provided on the front surface of the wiring board 10.

The light source 20, the capacitors 70A and 70B, and the retention unit 60 are provided on the front surface of the heat dissipation base material 100. The light diffusion member 30 is provided above the retention unit 60. Here, it is assumed that the outer shape of the heat dissipation base material 100 and the outer shape of the light diffusion member 30 are the same as each other. Here, the front surface means the front side of the paper surface of FIG. 1. More specifically, the side on which the heat dissipation base material 100 is provided in the wiring board 10 is referred to as the front surface, the front side, or the front surface side. The side on which the light source 20 is provided in the heat dissipation base material 100 is referred to as the front surface, the front side, or the front surface side.

The light source 20 is configured as a light emitting element array in which a plurality of light emitting elements are two-dimensionally arranged (see FIG. 4 described later). The light emitting element is, for example, a vertical cavity surface emitting laser element VCSEL. The description will be made below on the assumption that the light emitting element is a vertical cavity surface emitting laser element VCSEL. In the following description, the vertical cavity surface emitting laser element VCSEL may be referred to as a VCSEL. Since the light source 20 is provided on the front surface of the heat dissipation base material 100, the light source 20 emits light in a direction that is perpendicular to the front surface of the heat dissipation base material 100 and is away from the heat dissipation base material 100. That is, the light emitting element array is a surface emitting laser element array. A plurality of light emitting elements in the light source 20 are two-dimensionally arranged, and the surface of the light source 20 from which light is emitted may be referred to as an emission surface.

The light emitted from the light source 20 is incident on the light diffusion member 30. The light diffusion member 30 diffuses and emits the incident light. The light diffusion member 30 is provided to cover the light source 20 and the capacitors 70A and 70B. That is, the light diffusion member 30 is provided at a predetermined distance from the light source 20 and the capacitors 70A and 70B provided on the heat dissipation base material 100, by the retention unit 60 provided on the front surface of the heat dissipation base material 100. Thus, the light emitted from the light source 20 is diffused by the light diffusion member 30 and applied to the measurement target. In other words, the light emitted from the light source 20 is diffused by the light diffusion member 30 and applied in a wider range than a range in a case where the light diffusion member 30 is not provided.

In a case where three-dimensional measurement is performed by the ToF method, the drive unit 50 requires the light source 20 to emit pulsed light (referred to as emitted light pulse below) having a frequency of 100 MHz or more and a rising time of 1 ns or less, for example. In the case of face authentication as an example, the distance at which irradiation with light is performed is about 10 cm to 1 m. The range in which irradiation with light is performed is about 1 m square. The distance at which irradiation with light is performed is referred to as a measurement distance, and the range in which irradiation with light is performed is referred to as an irradiation range or a measurement range. A surface virtually provided in the irradiation range or the measurement range is referred to as an irradiation surface. The measurement distance to the measurement target and the irradiation range of the measurement target may be other than the measurement distance and the irradiation range described above, such as in cases other than face authentication.

Figure 3:
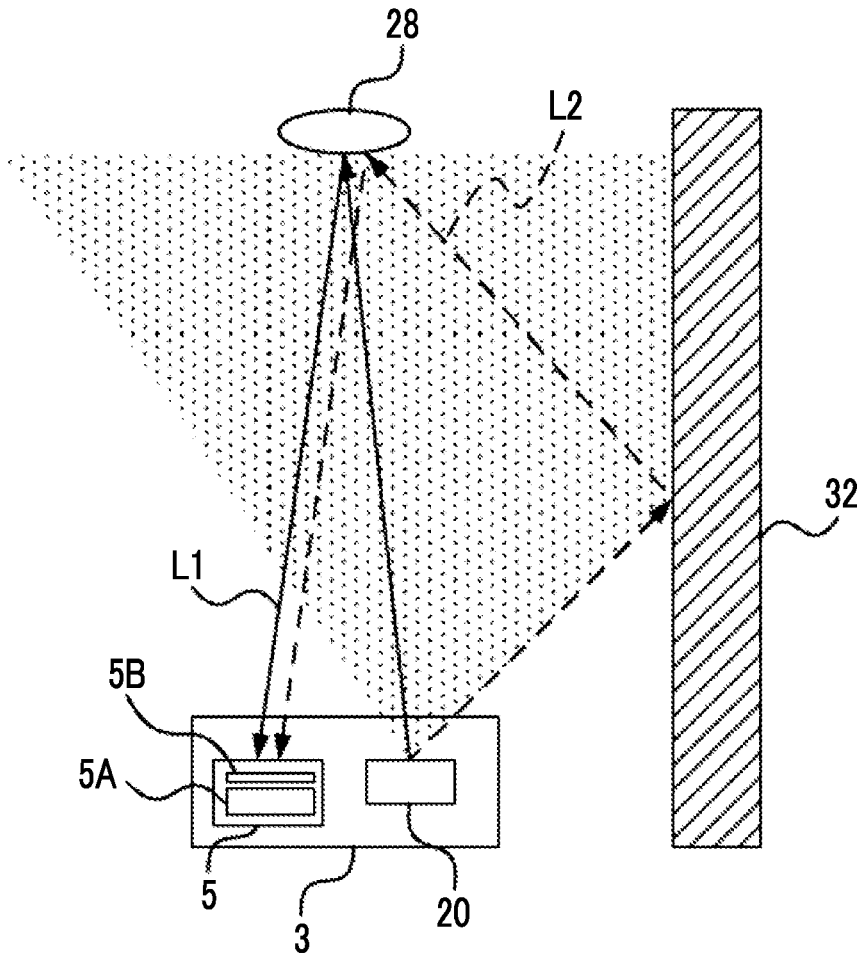
FIG. 3 is a diagram illustrating multipath.

As illustrated in FIG. 3, the 3D sensor 5 includes a light receiving element array 5A and a bandpass filter 5B. The light receiving element array 5A includes a plurality of light receiving elements, and outputs a signal corresponding to the time from a timing at which light is emitted from the light source 20 to a timing at which the 3D sensor 5 receives the light.

For example, each light receiving element of the 3D sensor 5 receives pulse-shaped reflected light (referred to as a received light pulse below) from the measurement target with respect to the emitted light pulse from the light source 20. In addition, each light receiving element accumulates charges corresponding to the time until the light is received. The 3D sensor 5 is configured as a CMOS device in which each light receiving element includes two gates and corresponding charge accumulation units. By alternately applying pulses to the two gates, the generated photoelectrons are transferred to either of the two charge accumulation units at a high speed. Charges corresponding to the phase difference between the emitted light pulse and the received light pulse are accumulated in the two charge accumulation units. The 3D sensor 5 outputs, as a signal, a digital value corresponding to the phase difference between the emitted light pulse and the received light pulse for each light receiving element via an AD converter. That is, the 3D sensor 5 outputs a signal corresponding to the time from the timing at which the light source 20 emits the light to the timing at which the 3D sensor 5 receives the light. That is, a signal corresponding to the three-dimensional shape of the measurement target is obtained from the 3D sensor 5. The AD converter may be provided in the 3D sensor 5 or may be provided outside the 3D sensor 5.

The bandpass filter 5B transmits reflected light of different wavelengths reflected from the detection target object, in accordance with the arrangement pattern of the plurality of light emitting elements that emit light of different wavelengths to the detection target object. The light receiving element array 5A receives the reflected light via the bandpass filter 5B.

The control unit 8 drives the drive unit 50 to cause the light source 20 to emit light and to irradiate the measurement target with light, and to cause the light receiving element array 5A to receive the reflected light from the measurement target. The three-dimensional shape of the measurement target is measured by using the ToF method from the amount of light received by the light receiving element array 5A.

The light source 20, the light diffusion member 30, the drive unit 50, and the capacitors 70A and 70B, which constitute the light emitting device 4, will be described below.

Configuration of Light Source 20

Figure 4:
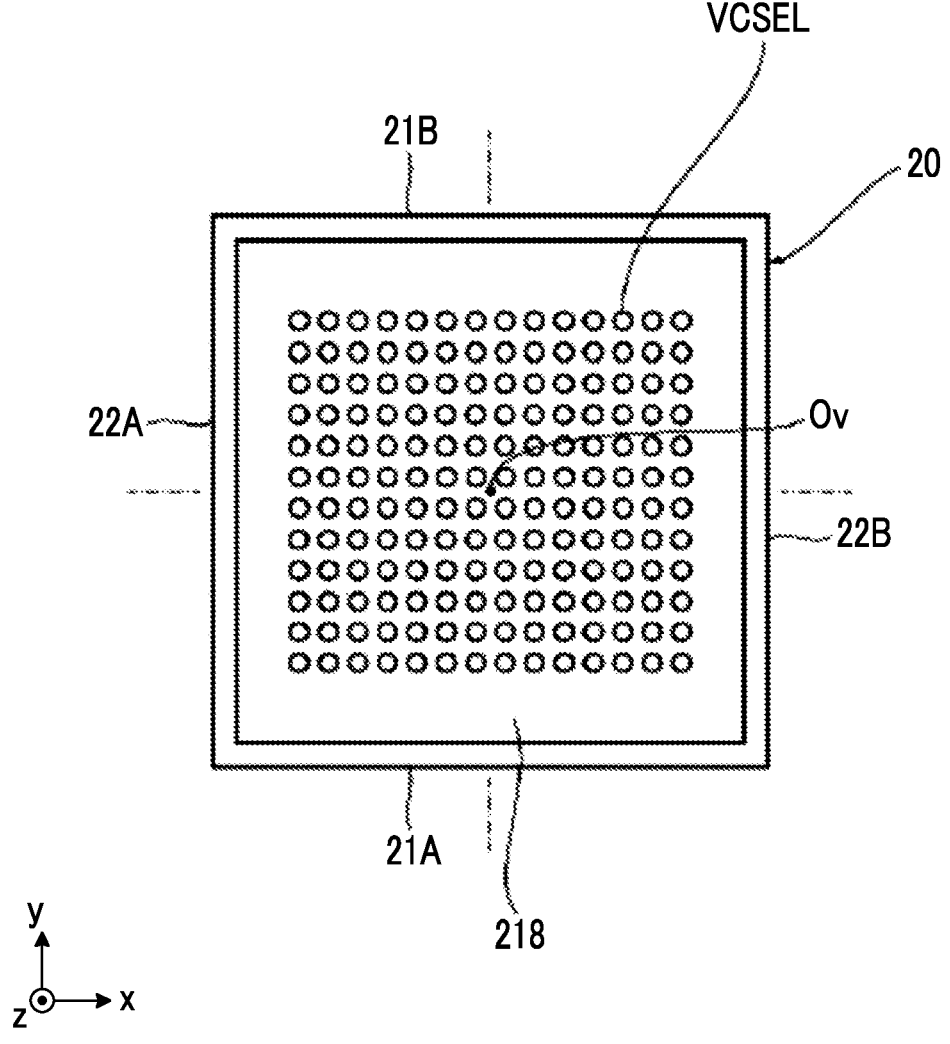
FIG. 4 is a plan view illustrating a light source.

FIG. 4 is a plan view of the light source 20. The light source 20 is configured by arranging a plurality of VCSELs in a two-dimensional array. That is, the light source 20 is configured as a light emitting element array using VCSELs as light emitting elements. The right direction of the paper is defined as an x-direction, and the upper direction of the paper surface is defined as a y-direction.

A direction perpendicular to the x-direction and the y-direction is defined as the z-direction. The front surface of the light source 20 refers to the front side of the paper surface, that is, the surface on the +z direction side. The back surface of the light source 20 refers to the back side of the paper surface, that is, the surface on the −z direction side. The plan view of the light source 20 is a view of the light source 20 viewed from the front surface side.

More specifically, in the light source 20, the side on which an epitaxial layer that functions as a light emitting layer (active region 206 described later) is formed is referred to as the front surface, the front side, or the front surface side of the light source 20.

The VCSEL is a light emitting element in which an active region as a light emission region is provided between a lower multilayer reflection mirror and an upper multilayer reflection mirror stacked on a semiconductor substrate 200, and laser light is emitted in a direction perpendicular to the front surface. Therefore, the VCSEL is easier to form a two-dimensional array as compared to the case using edge emitting laser. The number of VCSELs included in the light source 20 is, for example, 100 to 1000. A plurality of VCSELs are connected in parallel and driven in parallel. The above number of VCSELs is an example, and may be set in accordance with the measurement distance and the irradiation range.

An anode electrode 218 (see FIG. 5) common to a plurality of VCSELs is provided on the front surface of the light source 20. A cathode electrode 214 (see FIG. 5) is provided on the back surface of the light source 20. That is, the plurality of VCSELs are connected in parallel. By connecting and driving a plurality of VCSELs in parallel, light having higher intensity is emitted than intensity in a case where the VCSELs are driven individually.

Here, it is assumed that a shape (referred to as a planar shape, and the same applies below) of the light source 20 viewed from the front surface side) is a rectangle. The side surface on the −y direction side is referred to as a side surface 21A, the side surface on the +y direction side is referred to as a side surface 21B, the side surface on the −x direction side is referred to as a side surface 22A, and the side surface on the +x direction side is referred to as a side surface 22B. The side surface 21A faces the side surface 21B. The side surfaces 22A and 22B connect the side surfaces 21A and 21B and face each other.

The center of the planar shape of the light source 20, that is, the center in the x-direction and the y-direction is defined as a center Ov.

Drive Unit 50 and Capacitors 70A and 70B

In a case where the light source 20 is intended to be driven at a higher speed, low-side driving is favorable, for example. The low-side driving refers to a configuration in which a drive element such as a MOS transistor is located on the downstream side of a current path with respect to a drive target such as the VCSEL. Conversely, a configuration in which the drive element is located on the upstream side is referred to as high-side driving.

Figure 5:
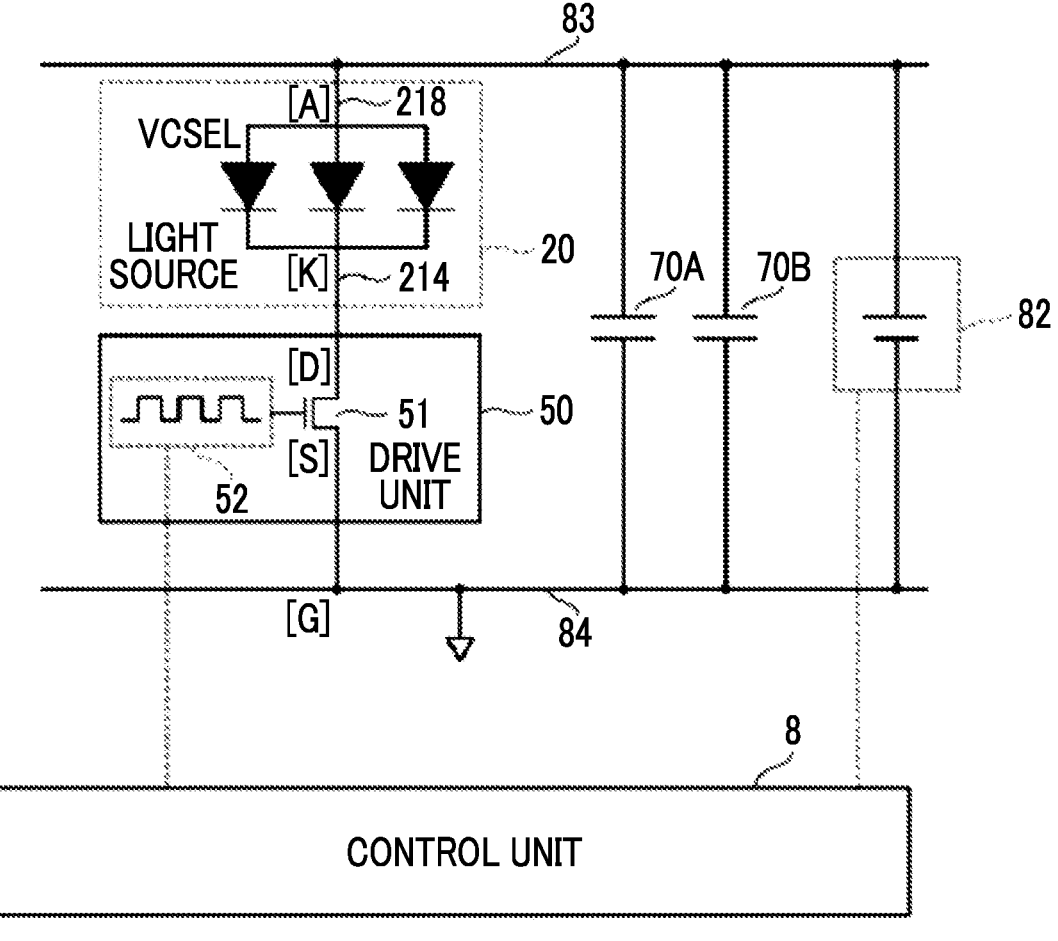
FIG. 5 is a circuit diagram illustrating the measurement apparatus.

FIG. 5 is a diagram illustrating an example of an equivalent circuit in a case where the light source 20 is driven by the low-side driving. FIG. 5 illustrates the VCSEL of the light source 20, the drive unit 50, the capacitors 70A and 70B, and a power supply 82. The power supply 82 is provided in the control unit 8 illustrated in FIG. 1. The power supply 82 generates a DC voltage having a power supply potential on the + side and a reference potential on the −side. The power supply potential is supplied to a power supply line 83, and the reference potential is supplied to a reference line 84. The reference potential may be referred to as a ground potential (may be referred to as GND. In FIG. 5, denoted as [G]).

The light source 20 is configured by connecting a plurality of VCSELs in parallel as described above. The anode electrode 218 (see FIG. 4. In FIG. 5, denoted as [A]) of the VCSEL is connected to the power supply line 83.

The drive unit 50 includes an n-channel MOS transistor 51 and a signal generation circuit 52 that turns the MOS transistor 51 on and off. The drain (denoted as [D] in FIG. 5) of the MOS transistor 51 is connected to the cathode electrode 214 (denoted as [K] in FIG. 5) of the VCSEL. The source (denoted as [S] in FIG. 5) of the MOS transistor 51 is connected to the reference line 84. The gate of the MOS transistor 51 is connected to the signal generation circuit 52. That is, the VCSEL and the MOS transistor 51 of the drive unit 50 are connected in series between the power supply line 83 and the reference line 84. Under the control of the control unit 8, the signal generation circuit 52 generates an "H level" signal for turning on the MOS transistor 51 and an "L level" signal for turning off the MOS transistor 51.

The capacitors 70A and 70B have one terminal connected to the power supply line 83 and the other terminal connected to the reference line 84. Here, in a case where there are a plurality of capacitors 70, the plurality of capacitors 70 are connected in parallel. That is, in FIG. 5, the capacitor 70 is assumed to be two capacitors 70A and 70B. The capacitor 70 is, for example, an electrolytic capacitor or a ceramic capacitor.

Next, a method of driving the light source 20, which is low-side driving, will be described.

First, it is assumed that a signal generated by the signal generation circuit 52 in the drive unit 50 has an "L level". In this case, the MOS transistor 51 is in an off state. That is, no current flows between the source ([S] in FIG. 5) and the drain ([D] in FIG. 5) of the MOS transistor 51. Thus, no current flows through the VCSEL connected in series with the MOS transistor 51. That is, the VCSEL is in a non-emissive state.

At this time, the capacitors 70A and 70B are connected to the power supply 82, one terminals of the capacitors 70A and 70B connected to the power supply line 83 have the power supply potential, and the other terminals connected to the reference line 84 have the reference potential. Therefore, the capacitors 70A and 70B are charged by a current flowing from the power supply 82 (charges are supplied).

Then, in a case where the signal generated by the signal generation circuit 52 in the drive unit 50 becomes an "H level", the MOS transistor 51 is turned on from the off state. Then, the capacitors 70A and 70B, and the MOS transistor 51 and the VCSEL connected in series form a closed loop. The charges accumulated in the capacitors 70A and 70B are supplied to the MOS transistor 51 and the VCSEL connected in series. In other words, a drive current flows through the VCSEL, and the VCSEL emits light. This closed loop corresponds to a drive circuit that drives the light source 20.

In a case where the signal generated by the signal generation circuit 52 in the drive unit 50 becomes an "L level" again, the MOS transistor 51 shifts from the ON state to the OFF state. As a result, the closed loop (drive circuit) of the capacitors 70A and 70B, and the MOS transistor 51 and the VCSEL connected in series becomes an open loop, and no drive current flows through the VCSEL. This causes the VCSEL to stop light emission. Then, charges from the power supply 82 to the capacitors 70A and 70B, and the capacitors 70A and 70B are charged.

As described above, the MOS transistor 51 repeats on and off, and the VCSEL repeats light emission and non-light emission, each time the signal output from the signal generation circuit 52 shifts between an "H level" and an "L level". The repetition of turning on and off of the MOS transistor 51 may be referred to as switching.

In the present exemplary embodiment, it is assumed that the light receiving element PD that receives the light emitted by each VCSEL is specified in advance. That is, the light emitted from a plurality of VCSELs is received by the corresponding light receiving element PD. Here, the VCSEL and the light receiving element PD may have a correspondence of any one of one-to-one, many-to-one, one-to-many, and many-to-many. To simplify the description, the case where the VCSEL and the light receiving element PD are in one-to-one correspondence will be described below.

In a case where the distance to the measurement target is measured by irradiating the measurement target with light from the light source 20, and receiving the reflected light, there is a problem that light interference due to multipath may occur. For example, as illustrated in FIG. 3, the light emitted from the light source 20 is not only direct light L1 that is directly incident on the measurement target 28 and reflected. For example, the light may be reflected by an obstacle such as a wall 32 and may be received by the 3D sensor 5 as multipath light L2 following a plurality of paths. Multipath causes the light receiving element to receive not only direct light but also indirect light that is not to be received, which may affect the accuracy of the measured distance.

Therefore, in the present exemplary embodiment, the light source 20 is arranged such that a plurality of VCSELs that emit light having different wavelengths to the measurement target are adjacent to each other. A plurality of VCSELs can be driven simultaneously.

Figure 6:
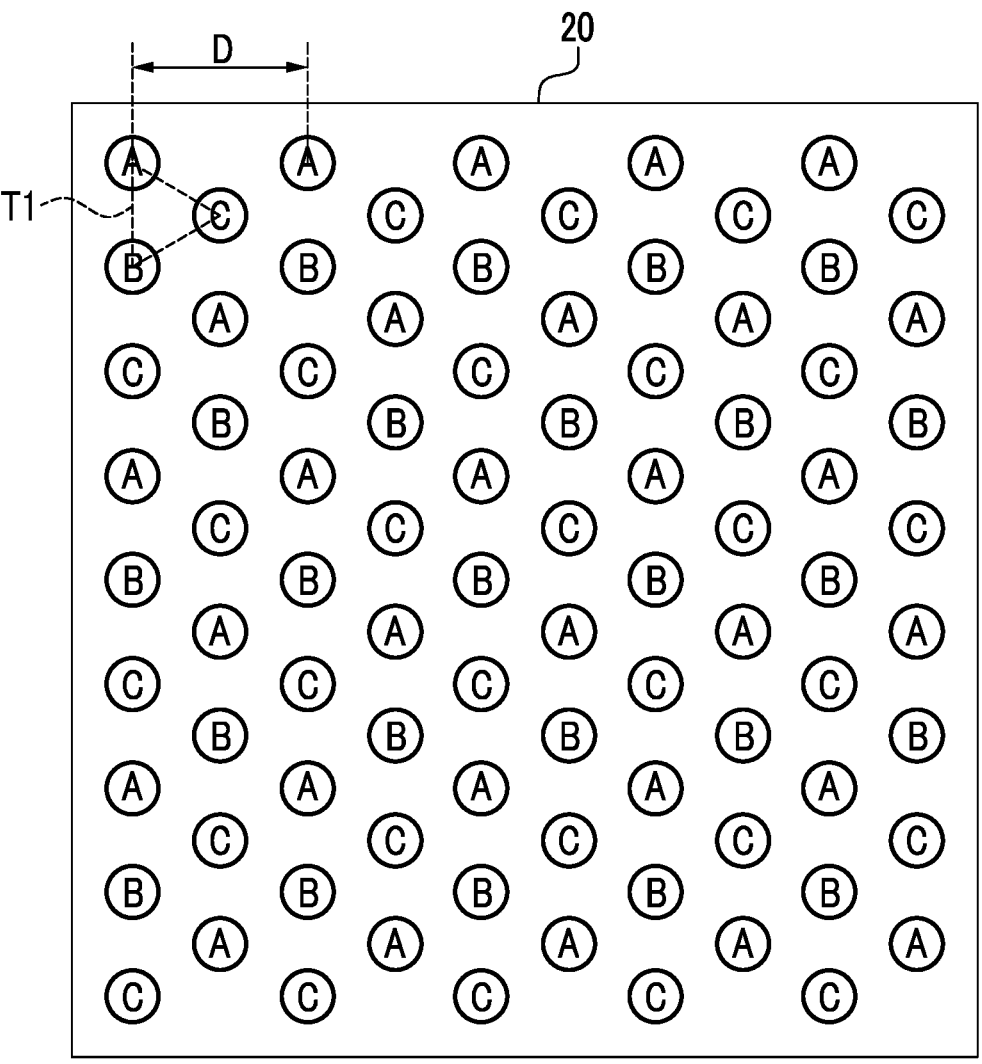
FIG. 6 is a plan view illustrating a light source including light emitting elements having three different wavelengths.
Figure 6:
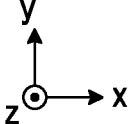

FIG. 6 illustrates the light source 20 in which VCSELs having three different wavelengths A, B, and C are arranged adjacent to each other. A VCSEL having a wavelength A is referred to as a light emitting element A, a VCSEL having a wavelength B is referred to as a light emitting element B, and a VCSEL having a wavelength C is referred to as a light emitting element C. The wavelength can be caused to vary by making the layer structure of the semiconductor be a structure corresponding to the wavelength.

In the example in FIG. 6, three light emitting elements A to C are arranged to form an equilateral triangle T1. Here, assuming that the length of one side of the equilateral triangle T is 1, the shortest distance between the light emitting elements having the same wavelength is $\sqrt{3}$. Specifically, for example, as illustrated in FIG. 6, the distance D between the light emitting elements A adjacent in the x-direction is $\sqrt{3}$.

That is, each of the light emitting elements A to C is arranged such that a shortest distance from other light emitting elements having the same wavelength is longer than a shortest distance from other light emitting elements having different wavelengths. For example, as illustrated in FIG. 6, the distance between the light emitting elements A and B having different wavelengths and the distance between the light emitting elements A and C having different wavelengths are 1, but the distance between the light emitting elements A having the same wavelength adjacent in the x-direction is $\sqrt{3}$. Thus, the distance between the light emitting elements having the same wavelength is longer.

Figure 7:
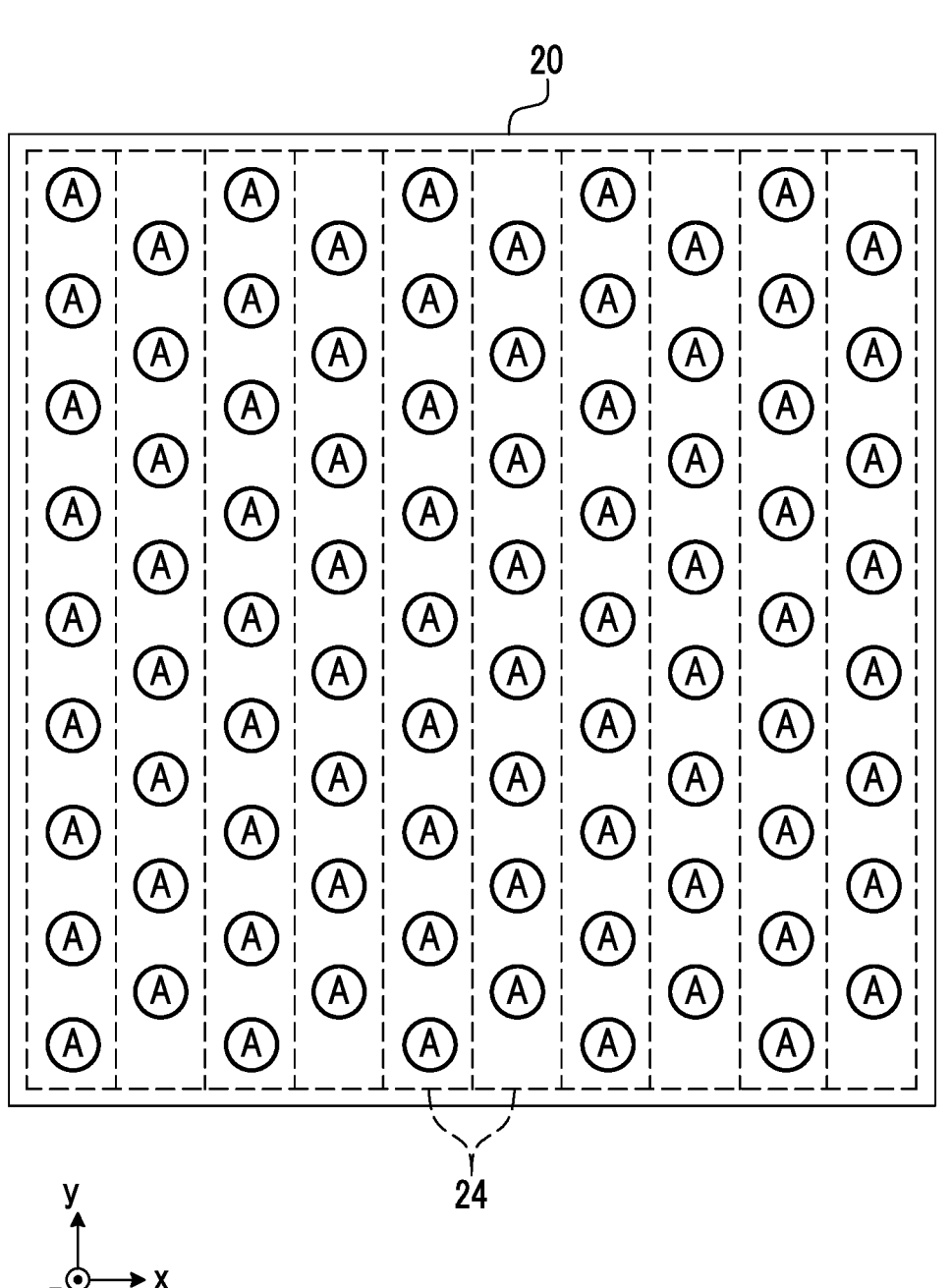
FIG. 7 is a plan view illustrating a light source including a plurality of light emitting elements having the same wavelength according to an example in the related art.

Here, for example, as illustrated in FIG. 7, in a case where the light emitting elements constituting the light source 20 are all the light emitting elements A having the same wavelength, multipath is likely to occur. In this case, it is necessary to divide the light source 20 into a plurality of banks (light emission sections) 24 and sequentially emit light for each bank. Therefore, the drive unit is required for each bank, and the number of times of light emission for distance measurement also increases.

On the other hand, in the present exemplary embodiment, the light emitting elements A to C having different wavelengths are arranged to form an equilateral triangle T. Thus, the distance between the light emitting elements A having the same wavelength is longer than the distance between the light emitting elements A and B having different wavelengths and the distance between the light emitting elements A and C having different wavelengths. As a result, light interference due to multipath is suppressed even though the light emitting elements A to C are simultaneously driven, compared to the case where the light emitting elements constituting the light source 20 are all the light emitting elements A having the same wavelength.

In the example in FIG. 6, a bandpass filter 5B transmits reflected light having different wavelengths A to C reflected from the measurement target, in accordance with the arrangement pattern of the light emitting elements A to C. That is, in the bandpass filter 5B, a filter that transmits light having a wavelength A, a filter that transmits light having a wavelength B, and a filter that transmits light having a wavelength C are the bandpass filters arranged in the same pattern as the arrangement pattern of the light emitting elements A to C in FIG. 6. Thus, the light receiving element array 5A receives light having the same wavelength pattern as the arrangement pattern of the light emitting elements A to C in FIG. 6.

Figure 8:
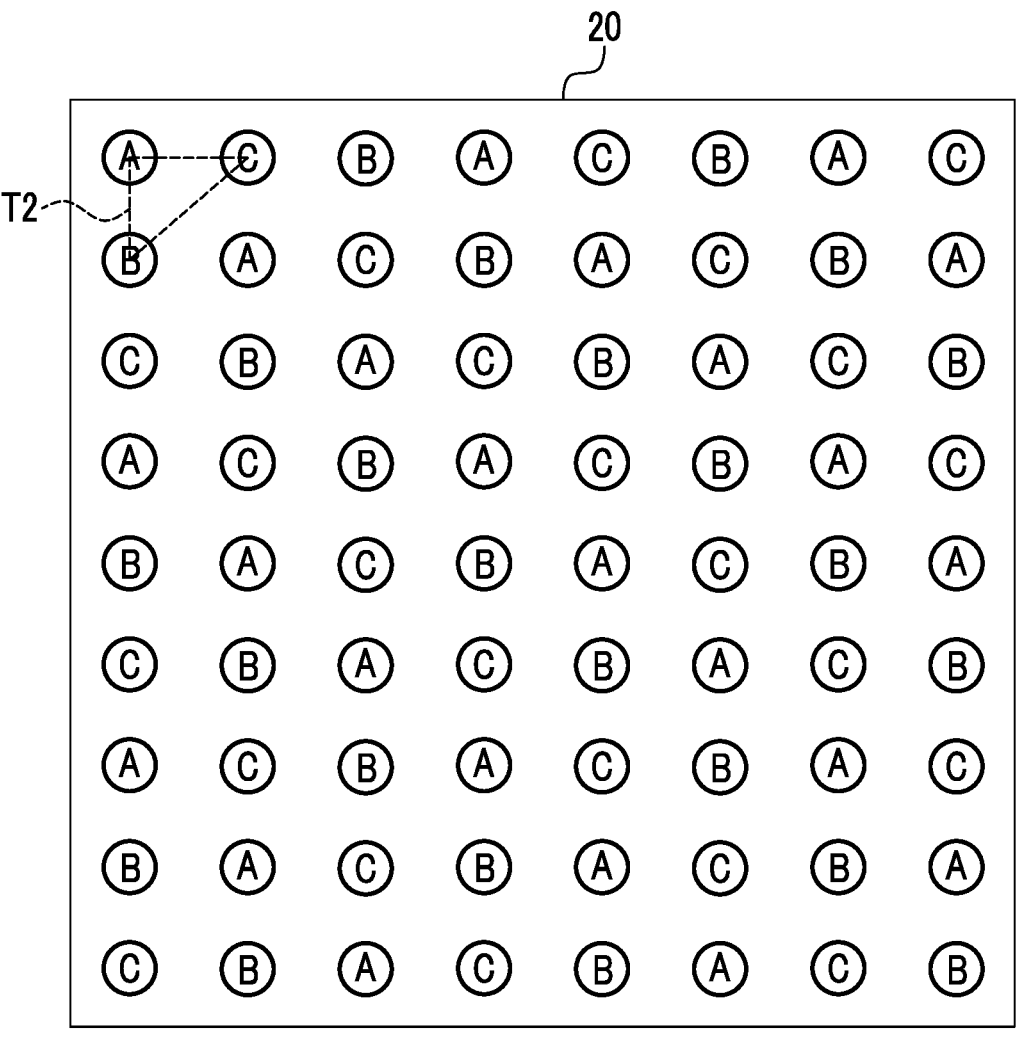
FIG. 8 is a plan view illustrating a light source including light emitting elements having three different wavelengths according to a modification example.

FIG. 8 illustrates an example in which the light emitting elements A to C are arranged to form a right-angled triangle T2. In this example as well, the distance between the light emitting elements A that have the same wavelength and are adjacent to each other in a diagonal direction in FIG. 8 is longer than the distance between the light emitting elements A and B having different wavelengths and the distance between the light emitting elements A and C.

Figure 9:
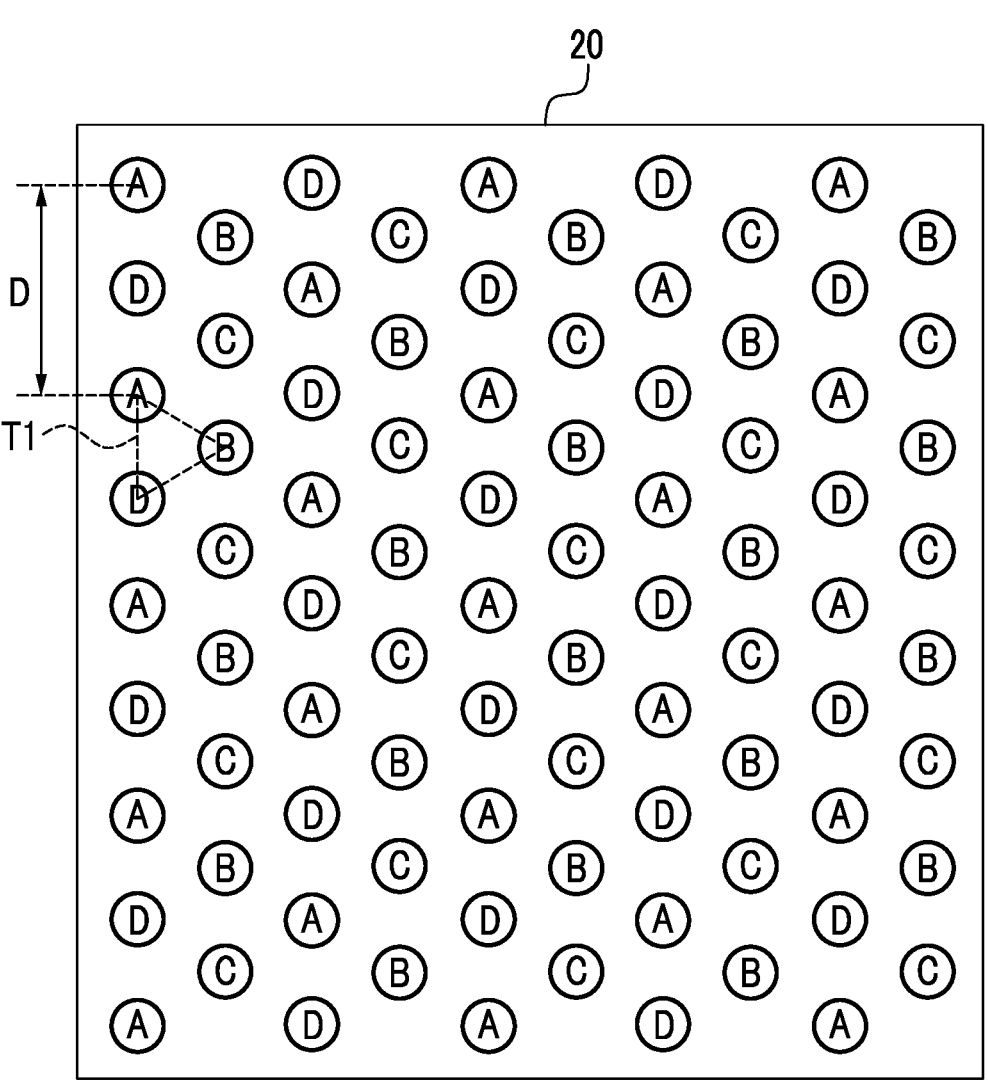
FIG. 9 is a plan view illustrating a light source including light emitting elements having four different wavelengths.
Figure 9:
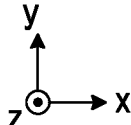

FIG. 9 illustrates an example in which four light emitting elements A to D having different wavelengths are arranged adjacent to each other. In the example of FIG. 9, adjacent light emitting elements in all directions are configured with different wavelengths. In the example of FIG. 9, the distance between the light emitting elements A and B, the distance between the light emitting elements A and C, and the distance between the light emitting elements A and D having different wavelengths are 1. The distance D between the light emitting elements A having the same wavelength is 2. That is, the distance between light emitting elements having the same wavelength is longer than the distance between light emitting elements having different wavelengths.

Figure 10:
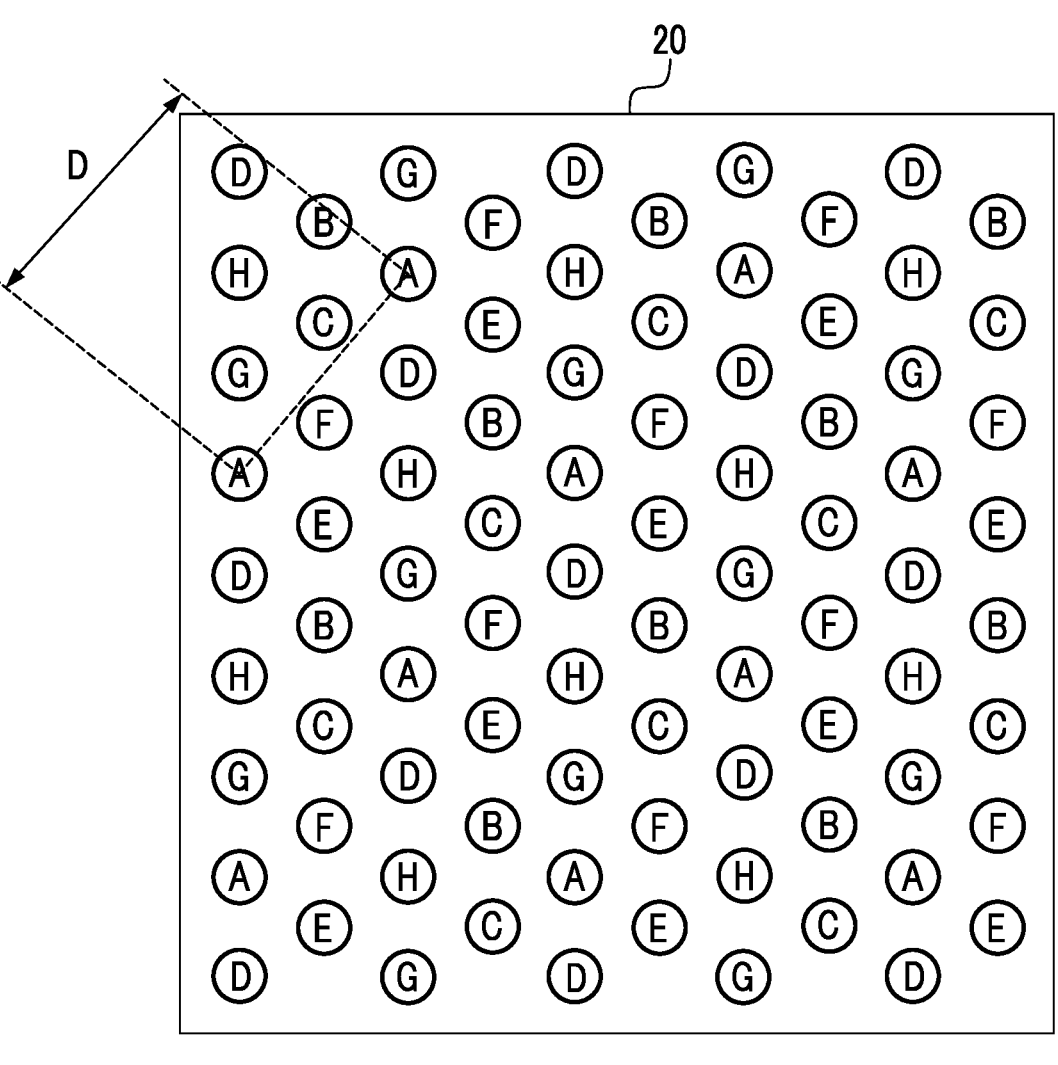
FIG. 10 is a plan view illustrating a light source including light emitting elements having eight different wavelengths.
Figure 10:
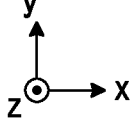

FIG. 10 illustrates an example in which eight light emitting elements A to H having different wavelengths are arranged adjacent to each other. In the example of FIG. 10, similarly to the example of FIG. 9, light emitting elements adjacent in all directions are configured with different wavelengths. In the example of FIG. 10, the distance between light emitting elements A and B having different wavelengths, the distance between light emitting elements A and C, the distance between light emitting elements A and D, the distance between light emitting elements A and E, the distance between light emitting elements A and F, and the distance between light emitting elements A and G is 1. In addition, the distance between light emitting elements A and H is $\sqrt{3}$, while the distance D between light emitting elements A having the same wavelength is $\sqrt{7}$. That is, the distance between light emitting elements having the same wavelength is longer than the distance between light emitting elements having different wavelengths.

Considering restrictions on manufacturing the light source 20 and the like, for example, it is preferable that the number of different wavelengths is, 3 or more and 8 or less.

In addition, for example, by covering a plurality of light emitting elements with a microlens array, subdividing the light emitting elements by using a diffractive optical element (DOE), or using a light receiving element with a large section, and the like, the light emitting element and the light receiving element may have a many-to-one correspondence. That is, the light receiving element array has a resolution lower than the light emitting element array. For example, a light emitting element array including 576 light emitting elements is partitioned into 3×3 light emission sections, with 8×8 light emitting elements as one light emission section. The light receiving element array is configured to include 3×3 light receiving elements corresponding to the light emission sections. In such a case, the light emitting element array may be configured such that the light emitting elements in one light emission section have the same wavelength and the light emission sections with different wavelengths are arranged adjacent to each other.

Although the exemplary embodiment has been described above, the technology of the present disclosure is not limited to the scope described in the above exemplary embodiments.

For example, in the present exemplary embodiment, the case where the three-dimensional shape of the measurement target is specified by measuring the distance to the measurement target has been described. For example, the three-dimensional shape of the measurement target may be specified only by detecting whether or not there is the measurement target within a predetermined distance.

In addition, the control unit 8 that measures the three-dimensional shape of the measurement target may be configured with a dedicated processor (for example, GPU: Graphics Processing Unit, ASIC: Application Specific Integrated Circuit, FPGA: Field Programmable Gate Array, programmable logic device, and the like), and may be incorporated in the optical device 3. In this case, the distance to the measurement target is measured by the optical device 3 alone.

In the present exemplary embodiment, the configuration in which the measurement program 16A is installed in the storage unit 16 has been described, but the present invention is not limited to this. The measurement program 16A according to the present exemplary embodiment may be provided in a mode in which the information processing program is recorded on a computer-readable storage medium. For example, the measurement program 16A according to the present exemplary embodiment may be provided in a form of being recorded in an optical disc such as a CD (Compact Disc)-ROM and a DVD (Digital Versatile Disc)-ROM, or semiconductor such as a universal serial bus (USB) memory and a memory card. Further, the measurement program 16A according to the present exemplary embodiment may be acquired from an external device via a communication line connected to the communication unit 14.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light emitting element array comprising:
a plurality of light emitting elements that emit light having different wavelengths to a detection target object and are arranged to be adjacent to each other,
wherein each of the plurality of light emitting elements is arranged such that a shortest distance from other light emitting elements having the same wavelength is longer than a shortest distance from other light emitting elements having different wavelengths.

2. The light emitting element array according to claim 1, wherein three of the light emitting elements having the different wavelengths are arranged to form an equilateral triangle.

3. The light emitting element array according to claim 1, wherein all the light emitting elements adjacent in all directions are configured at different wavelengths.

4. The light emitting element array according to claim 2, wherein all the light emitting elements adjacent in all directions are configured at different wavelengths.

5. The light emitting element array according to claim 1, wherein the number of the wavelengths is 3 or more and 8 or less.

6. The light emitting element array according to claim 2, wherein the number of the wavelengths is 3 or more and 8 or less.

7. The light emitting element array according to claim 3, wherein the number of the wavelengths is 3 or more and 8 or less.

8. The light emitting element array according to claim 4, wherein the number of the wavelengths is 3 or more and 8 or less.

9. A detection apparatus comprising:
a light emitting element array in which a plurality of light emitting elements that emit light having different wavelengths to a detection target object are arranged to be adjacent to each other;
a bandpass filter that is provided in a light receiving unit and causes reflected light to be transmitted through the bandpass filter in accordance with an arrangement pattern of the plurality of light emitting elements having the different wavelengths, the reflected light being reflected from the detection target object and having a different wavelength;
a light receiving element array that is provided in the light receiving unit and includes a plurality of light receiving elements that receive the reflected light via the bandpass filter;
a drive unit that drives the light emitting elements; and
a detection unit that detects the detection target object from an amount of light received by the plurality of light receiving elements,
wherein each of the plurality of light emitting elements is arranged such that a shortest distance from other light emitting elements having the same wavelength is longer than a shortest distance from other light emitting elements having different wavelengths.

10. The detection apparatus according to claim 9, wherein light emitted from the plurality of light emitting elements is received by the corresponding light receiving element.

11. The detection apparatus according to claim 9, wherein the drive unit simultaneously drives the plurality of light emitting elements.

12. The detection apparatus according to claim 10, wherein the drive unit simultaneously drives the plurality of light emitting elements.

13. The detection apparatus according to claim 9, wherein the detection unit detects a distance to the detection target object by time of flight.

14. The detection apparatus according to claim 10, wherein the detection unit detects a distance to the detection target object by time of flight.

15. The detection apparatus according to claim 11, wherein the detection unit detects a distance to the detection target object by time of flight.

16. The detection apparatus according to claim 12, wherein the detection unit detects a distance to the detection target object by time of flight.

* * * * *